(12) United States Patent
Newcomb et al.

(10) Patent No.: US 12,049,257 B2
(45) Date of Patent: Jul. 30, 2024

(54) TRANSPARENT COMPOSITE FOR A VEHICLE ROOF

(71) Applicant: GM GLOBAL TECHNOLOGY OPERATIONS LLC, Detroit, MI (US)

(72) Inventors: Bradley A. Newcomb, Troy, MI (US); Joung Min Choi, Rochester Hills, MI (US); Julien P. Mourou, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 428 days.

(21) Appl. No.: 17/406,024

(22) Filed: Aug. 18, 2021

(65) Prior Publication Data

US 2023/0054062 A1 Feb. 23, 2023

(51) Int. Cl.
*B62D 25/06* (2006.01)
*C08L 101/00* (2006.01)

(52) U.S. Cl.
CPC ............ *B62D 25/06* (2013.01); *C08L 101/00* (2013.01); *C08L 2201/08* (2013.01); *C08L 2201/10* (2013.01); *C08L 2205/16* (2013.01)

(58) Field of Classification Search
CPC ..... B62D 25/06; B62D 29/043; C08L 101/00; B32B 2605/006; B32B 2605/08
USPC .............. 296/210, 215, 901.01, 181.2, 185.1
See application file for complete search history.

(56) References Cited

U.S. PATENT DOCUMENTS

| | | | |
|---|---|---|---|
| 4,978,165 A * | 12/1990 | Schreiter | B60J 7/057 296/222 |
| 5,941,596 A | 8/1999 | See | |
| 7,163,254 B2 * | 1/2007 | Fischer | B60J 7/04 296/108 |
| 8,282,158 B2 * | 10/2012 | Verhee | B62D 25/06 296/215 |
| 9,963,172 B2 | 5/2018 | Iyoshi et al. | |
| 10,272,753 B1 * | 4/2019 | Wolf | B60J 7/043 |
| 11,149,132 B2 * | 10/2021 | Akashi | C08L 1/04 |
| 11,267,514 B2 * | 3/2022 | Aitharaju | B62D 29/043 |
| 11,383,771 B1 | 7/2022 | Newcomb et al. | |
| 11,420,683 B2 | 8/2022 | Newcomb et al. | |
| 11,541,939 B2 | 1/2023 | Newcomb et al. | |
| 2004/0075302 A1 * | 4/2004 | Chon | B62D 29/00 296/210 |
| 2015/0151796 A1 | 6/2015 | Berger et al. | |

(Continued)

FOREIGN PATENT DOCUMENTS

| | | |
|---|---|---|
| CN | 207060169 U | 3/2018 |
| CN | 115707587 A | 2/2023 |
| CN | 115707617 A | 2/2023 |
| DE | 102004008006 A1 | 9/2005 |

(Continued)

OTHER PUBLICATIONS

Muench et al., EP 2664445 A1, machine translation, Nov. 20, 2013 (Year: 2013).*

(Continued)

*Primary Examiner* — Amy R Weisberg
*Assistant Examiner* — Wenwei Zhuo
(74) *Attorney, Agent, or Firm* — Harness, Dickey & Pierce, P.L.C.

(57) ABSTRACT

The present disclosure provides a roof for a vehicle upper body structure. The roof includes a body extending between a first side and a second side, and extending between a front end and a back end. The front end is configured to be coupled to a header. The body includes a polymer and a plurality of fibers. At least a portion of the body has a transparency of greater than or equal to about 4%.

18 Claims, 9 Drawing Sheets

(56) References Cited

U.S. PATENT DOCUMENTS

| | | | |
|---|---|---|---|
| 2017/0114180 A1* | 4/2017 | Grunder | C08K 7/02 |
| 2017/0239883 A1 | 8/2017 | Terada et al. | |
| 2017/0240210 A1 | 8/2017 | Terada et al. | |
| 2017/0369003 A1 | 12/2017 | Williams et al. | |
| 2021/0008964 A1* | 1/2021 | Chen | B32B 3/02 |
| 2021/0116630 A1* | 4/2021 | Wang | G02B 6/0003 |
| 2022/0212449 A1 | 7/2022 | Newcomb et al. | |
| 2022/0212723 A1 | 7/2022 | Newcomb et al. | |
| 2022/0264705 A1 | 8/2022 | Nielsen et al. | |
| 2022/0348149 A1 | 11/2022 | Huelsen | |
| 2023/0054062 A1 | 2/2023 | Newcomb et al. | |
| 2023/0055378 A1 | 2/2023 | Newcomb et al. | |
| 2023/0192195 A1 | 6/2023 | Newcomb et al. | |

FOREIGN PATENT DOCUMENTS

| | | | | |
|---|---|---|---|---|
| DE | 102004056075 A1 | | 5/2006 | |
| DE | 102009013397 A1 | * | 9/2010 | B29C 70/22 |
| DE | 102022111238 A1 | | 2/2023 | |
| DE | 102022111241 A1 | | 2/2023 | |
| EP | 2664445 A1 | * | 11/2013 | B29C 70/026 |
| KR | 20140012973 A | * | 2/2014 | |

OTHER PUBLICATIONS

Yamaji et al., KR 20140012973 A, machine translation, Feb. 4, 2014 (Year: 2014).*

Nalbach et al. (DE 102009013397 A1) machine translation (Year: 2010).*

Jiang, "A Car Body B-Pillar", Published: Mar. 2, 2018, Publisher: Chinese Patent Office, Edition: CN207060169U (Year: 2018).

Ilzhoefer et al., "Transparent Plastic Vehicle Bodywork Part, Made from Glass Reinforced Thermoplastic or Duroplast Polymer Composite Material", Published: Feb. 19, 2004, Publisher: German Patent Office, Edition: DE102004008006A1 (Year: 2004).

Friedrich, "Structural composite component, in particular for automobile structures, has nanoparticle reinforced matrix areas with different transparency", Published: May 18, 2006, Publisher: German Patent Office, Edition: DE102004056075A1 (Year: 2006).

Engelhardt, "Composite structure made of fibre-reinforced plastic and method for its manufacture", Published: Nov. 20, 2018, Publisher: European Patent Office, Edition: EP2664445A1 (Year: 2018).

Bradley Allen Newcomb et al.; U.S. Appl. No. 18/112,339, filed Feb. 21, 2023, titled "Transparent Composite for a Vehicle Roof"; 68 pages.

Newcomb et al; U.S. Appl. No. 17/141,478, filed Jan. 5, 2021; application, drawings, and Filing Receipt (40 pages).

Newcomb et al; U.S. Appl. No. 17/152,965, filed Jan. 20, 2021; application, drawings, and Filing Receipt (27 pages).

Newcomb et al; U.S. Appl. No. 17/141,524, filed Jan. 5, 2021; application, drawings, and Filing Receipt (40 pages).

Newcomb et al; U.S. Appl. No. 17/226,232, filed Apr. 9, 2021; application, drawings, and Filing Receipt (29 pages).

* cited by examiner

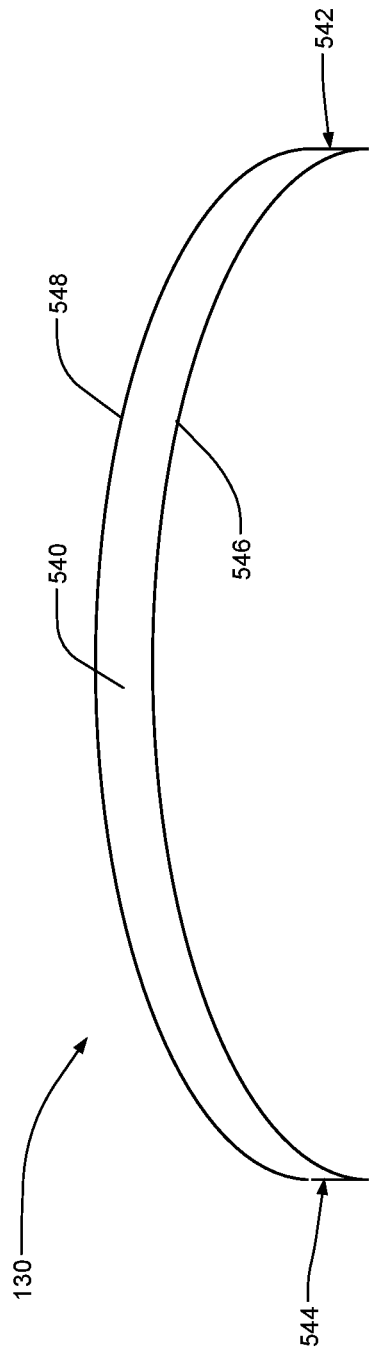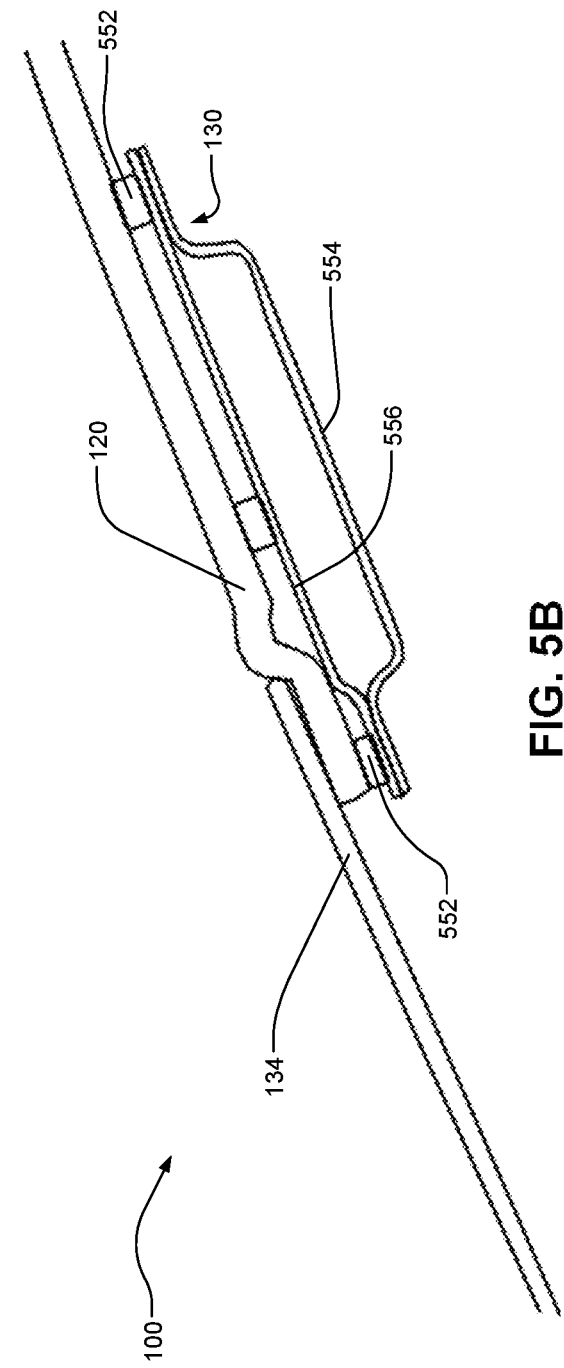

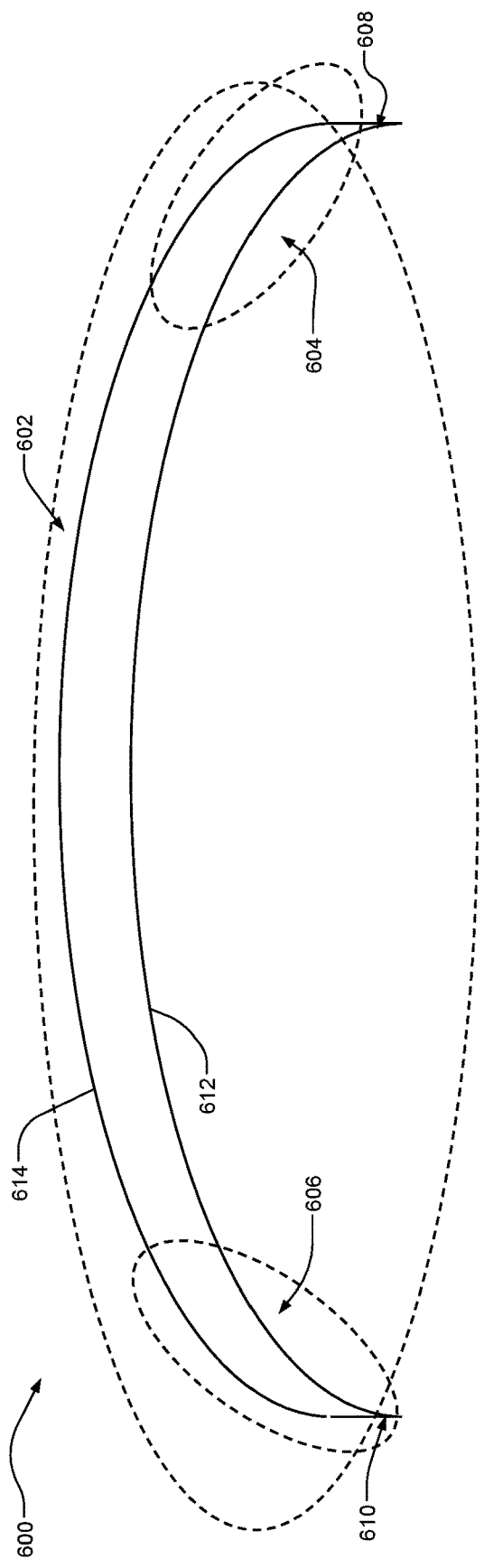
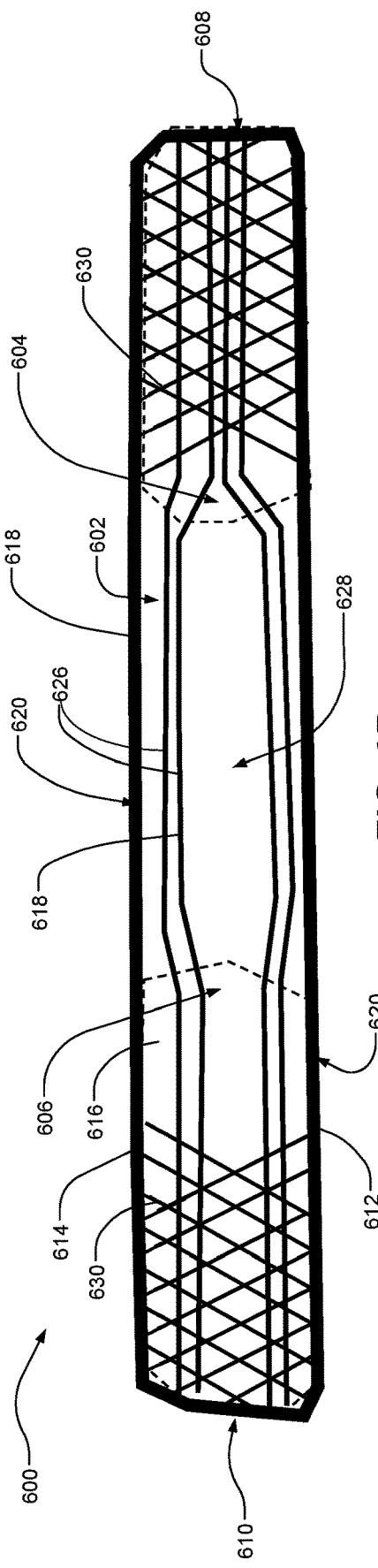
FIG. 6A
FIG. 6B

TRANSPARENT COMPOSITE FOR A VEHICLE ROOF

INTRODUCTION

The present disclosure relates to a transparent component for a vehicle upper body structure.

This section provides background information related to the present disclosure which is not necessarily prior art.

Vehicle upper body assemblies provide structural support and mounting locations for other vehicle components. It is advantageous to improve the strength and structural performance of vehicle upper body assemblies. However, it is also advantageous that components in automobiles or other vehicles to be lightweight to improve efficiency. Furthermore, it is advantageous that components of a structural assembly be at least partially transparent to improve occupant visibility and/or aesthetics. Thus, vehicle components in structural assemblies that exhibit adequate strength during normal service, while minimizing component weight and increasing occupant visibility are advantageous.

SUMMARY

This section provides a general summary of the disclosure, and is not a comprehensive disclosure of its full scope or all of its features.

The present disclosure relates to a transparent composite vehicle roof and vehicle upper body assemblies including the transparent roof.

In various aspects, the present disclosure provides a roof for a vehicle upper body structure. The roof includes a body extending between a first side and a second side, and extending between a front end and a back end. The body includes a polymer and a plurality of fibers. The front end is configured to be coupled to a header. At least a portion of the body has a transparency of greater than or equal to about 4%.

In one aspect, the roof has a transparency of greater than or equal to about 50% to less than or equal to about 99%.

In one aspect, a volume percent of the plurality of fibers is greater than or equal to about 5 volume percent to less than or equal to about 35 volume percent.

In one aspect, a local tensile strength of the body is greater than or equal to about 40 MPa to less than or equal to about 1000 MPa.

In one aspect, at least a portion of the body is free of fibers.

In one aspect, the plurality of fibers is dispersed substantially homogeneously throughout the body.

In one aspect, the body includes a first region and a second region. The first region has a first transparency and a first tensile strength. The second region has a second transparency and a second tensile strength. The second transparency is greater than the first transparency. The second tensile strength is less than the first tensile strength.

In one aspect, the first region includes a first volume percent of fibers. The second region includes a second volume percent of fibers. The first volume percent of fibers is greater than the second volume percent of fibers.

In one aspect, the first region defines a first thickness. The second region defines a second thickness. The first thickness is greater than the second thickness.

In one aspect, the body further includes a third region having a third transparency and a third tensile strength.

In one aspect, the body further includes a fourth region having a fourth transparency and a fourth tensile strength.

In one aspect, the body defines a transparency gradient.

In one aspect, the transparency gradient includes a plurality of transparency gradients.

In one aspect, the plurality of transparency gradients includes a first gradient and a second gradient. The second gradient has a substantially equal rate of change to the first gradient.

In one aspect, the polymer is selected from the group consisting of: an epoxy, a polyurethane (PUR), a polycarbonate (PC), a polymethyl methacrylate (PMMA), a polyethylene terephthalate (PET), a polyacrylate (acrylic), a polyamide (PA) (e.g., nylon), co-polymers thereof, and combinations thereof.

In one aspect, the plurality of fibers is selected from the group consisting of: glass fibers, carbon fibers, basalt fibers, aramid fibers, polyethylene fibers, polypropylene fibers, natural fibers, or any combination thereof.

In one aspect, the plurality of fibers have a shape selected from the group consisting of: cylindrical, flat, or both cylindrical and flat. The plurality of fibers have an orientation selected from the group consisting of: continuous in a first planar direction, discontinuous in a first planar direction, discontinuous in a plurality of directions, or any combination thereof.

In one aspect, the plurality of fibers includes a plurality of continuous fibers and a plurality of discontinuous fibers.

In one aspect, the body further includes an additive selected from the group consisting of: ultraviolet (UV) absorbers, quenchers, hindered amine light stabilizers (HALS), or combinations thereof.

In various aspects, the present disclosure provides an upper body structure. The upper body structure includes a first side structure, a second side structure, a header, and a roof. The roof includes a body extending between a first side and a second side, and between a front end and a back end. The front end is configured to be coupled to the header. The first side is configured to be coupled to the first side structure. The second side is configured to be coupled to the second side structure. The body includes a polymer and a plurality of fibers. At least a portion of the body has a transparency of greater than or equal to about 4%.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 5A is a top view of the header of FIG. 1 according to various aspects of the present disclosure;

FIG. 5B is a partial cross-sectional view of the upper body structure of FIG. 1 taken at line 5B-5B of FIG. 1;

FIG. 6A is a top view of another header according to various aspects of the present disclosure;

FIG. 6B is a schematic view of the header of FIG. 6A;

Corresponding reference numerals indicate corresponding parts throughout the several views of the drawings.

DETAILED DESCRIPTION

Figure 1:
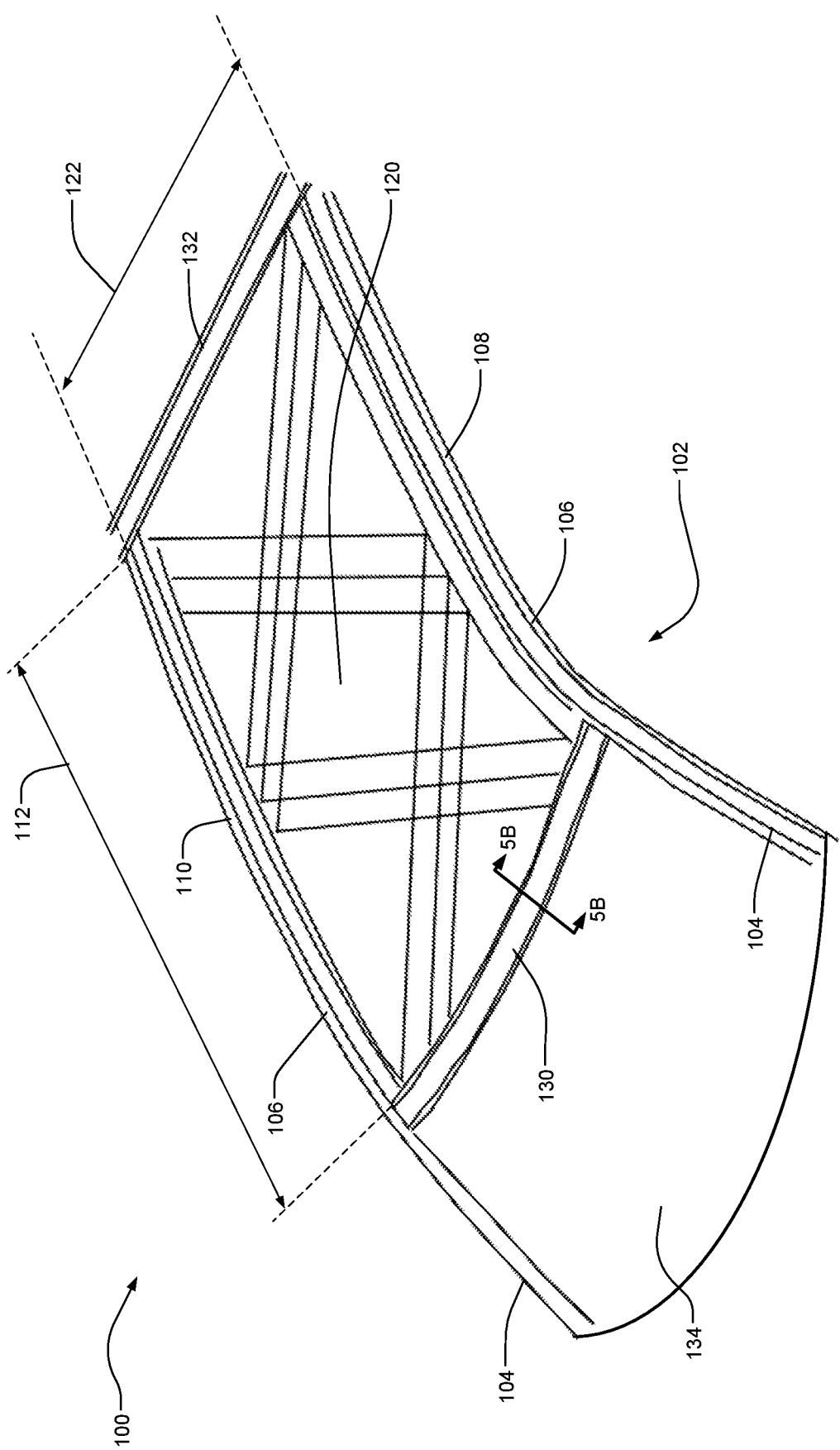
FIG. 1 is a perspective view of a vehicle upper body structure including a header and a roof according to various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Structural assemblies may be used in vehicles to provide structural support and/or mounting locations for other vehicle components. A structural assembly for an upper body structure may include multiple upper body components such as a front header, a rear header, a roof, a driver-side roof rail, a passenger-side roof rail, and multiple pairs of structural pillars. The roof may extend substantially rearward in vehicle and join the driver-side roof rail to the passenger-side roof rail. The header component may join the driver-side roof rail to the passenger-side roof rail. The header component may support both the roof and a windshield and join the roof to the windshield. It is advantageous for an upper body structure to have a high stiffness and strength in local regions near the roof rails and structural pillars, particularly near the joints of the header to the roof rails and the roof to the roof rails.

Some structural components, including upper body components, may be constructed from metal, such as steel. Some structural components may be constructed from an opaque fiber-reinforced composite material.

Some structural components, including upper body components may be constructed from glass (e.g., sunroofs). Some structural components may be constructed from a laminate composite. Some structural assemblies including glass and/or laminate composite components may be integrally formed with additional reinforcement components to achieve a desired strength and mechanical performance.

Upper body components may be opaque and therefore reduce or inhibit occupant visibility in the respective vehicle regions. Some upper body structures may be complex to assemble because of a large quantity of reinforcement components. Moreover, structural assemblies including metal and/or glass components may be heavy, leading to a decreased fuel efficiency and/or decreased battery range in the vehicle.

In various aspects, the present disclosure provides a transparent component for a vehicle upper body structure (also referred to as "the upper body component"). The upper body component may be configured to provide structural support, occupant visibility, and shield occupants from rain, snow ultraviolet (UV) light, and other elements. As used herein, transparent means that at least a portion of the component has a transparency of greater than 0%. The upper body component may be constructed from or include a fiber-reinforced composite. The fiber-reinforced composite may include a polymer and a plurality of fibers. In certain aspects, the transparent component may include a first region having a relatively higher strength and a relatively lower transparency and a second region having a relatively lower strength and a relatively higher transparency. In certain aspects, the transparent component may include a header (e.g., a front header and/or a rear header), a roof, or a header and a roof. In certain aspects, the present disclosure provides an upper body structure including a header and a roof, with at least one of the header and roof (and optionally both the header and roof) being transparent.

Fiber-reinforced composite upper body components according to various aspects of the present disclosure may be lighter than metal and/or glass upper body components. Such lighter weight upper body components may improve vehicle fuel efficiency and/or battery range. In certain aspects, the upper body component may include multiple regions having tailored strengths and transparencies. For example, regions that are expected to experience higher loads may have high strengths (e.g., near the upper body component and roof rail joints and/or pillar joints). Regions that are expected to experience lower loads (e.g., near the centerline of the vehicle) may include a transparent polymer and have a reduced fiber volume fraction, a different type of fibers (e.g., material, length, and/or layout), or be substantially free of fibers, and may therefore exhibit a higher transparency than the higher-strength regions.

In various aspects, the stiffness and strength of the at least partially transparent upper body component may achieve desired mechanical properties of the upper body structure. In certain aspects, the at least partially transparent component may be free of additional reinforcement components. In certain aspects, a local tensile strength of the upper body component (a tensile stress in at least one region of the upper body component) may be greater than or equal to about 40 MPa, optionally greater than or equal to about 100 MPa, optionally greater than or equal to about 200 MPa, optionally greater than or equal to about 300 MPa, optionally greater than or equal to about 400 MPa, optionally greater than or equal to about 600 MPa, optionally greater than or equal to about 800 MPa, optionally greater than or equal to about 1000 MPa, optionally greater than or equal to about 1200 MPa, optionally greater than or equal to about 1400 MPa, optionally greater than or equal to about 1600 MPa, optionally greater than or equal to about 1800 MPa, optionally greater than or equal to about 2000 MPa, optionally greater than or equal to about 2200 MPa, or optionally greater than or equal to about 2400 MPa. In certain aspects, a tensile modulus of the upper body component may be greater than or equal to about 4 GPa, optionally greater than or equal to about 6 GPa, optionally greater than or equal to about 8 GPa, optionally greater than or equal to about 10 GPa, optionally greater than or equal to about 50 GPa, optionally greater than or equal to about 100 GPa, optionally greater than or equal to 200 GPa, optionally greater than or equal to 300 GPa, optionally greater than or equal to 400 GPa, or optionally greater than or equal to 500 GPa. A torsional stiffness of the upper body component may be greater than or equal to about 24 kNm/deg, optionally greater than or equal to about 26 kNm/deg, optionally greater than or equal to about 28 kNm/deg, optionally greater than or equal to about 30 kNm/deg, optionally greater than or equal to about 32 kNm/deg, optionally greater than or equal to about 34 kNm/deg, optionally greater than or equal to about 36 Nm/deg, optionally greater than or equal to about 38 kNm/deg, or optionally greater than or equal to 40 kNm/deg.

The upper body component may be configured to achieve a desired maximum deflection. The deflection may be measured by the amount of component displacement under an applied linear unit load. In one example, under an applied linear unit load of 1 kN, the upper body component deflection may be less than or equal to about 0.6 mm, optionally less than or equal to about 0.5 mm, optionally less than or equal to about 0.4 mm, optionally less than or equal to 0.3 mm, optionally less than or equal to about 0.2 mm, optionally less than or equal to about 0.1 mm, or optionally less than or equal to about 0.05 mm.

In various aspects, the transparent upper body component improves occupant visibility compared to a substantially opaque upper body component. At least a portion of the transparent upper body component (or optionally substantially the entire transparent upper body component) may have a transparency, or average light transmittance, of greater than or equal to about 4% to less than or equal to about 99% or optionally greater than or equal to about 50% to less than or equal to about 99%. In certain aspects, the portion may have a transparency of greater than or equal to about 4%, optionally greater than or equal to about 10%, optionally greater than or equal to about 15%, optionally greater than or equal to about 20%, optionally greater than or equal to about 25%, optionally greater than or equal to about 30%, optionally greater than or equal to about 35%, optionally greater than or equal to about 40%, optionally greater than or equal to about 45%, optionally greater than or equal to about 50%, optionally greater than or equal to about 55%, optionally greater than or equal to about 60%, optionally greater than or equal to about 65%, optionally greater than or equal to about 70%, optionally greater than or equal to about 75%, optionally greater than or equal to about 80%, optionally greater than or equal to about 85%, optionally greater than or equal to about 90%, or optionally greater than or equal to about 95%. In certain aspects, the transparency is less than or equal to about 100%, optionally less than or equal to about 90%, optionally less than or equal to about 80%, optionally less than or equal to about 70%, optionally less than or equal to about 60%, optionally less than or equal to about 50%, optionally less than or equal to about 40%, optionally less than or equal to about 30%, optionally less than or equal to about 20%, or optionally less than or equal to about 10%.

In one example, a transparent upper body component includes two regions. A first region has a first transparency ranging from greater than or equal to 0% to less than or equal to about 20%. A second region has a second transparency ranging from greater than or equal to about 20% to less than or equal to about 99%.

In another example, a transparent upper body component includes a first region having a first transparency ranging from greater than or equal to about 0% to less than or equal to about 4%. The upper body component further includes a second region having a second transparency ranging from greater than or equal to about 5% to less than or equal to about 99%.

The upper body component according to various aspects of the present disclosure may include a polymer and a plurality of fibers. The polymer may be a thermoset polymer or a thermoplastic polymer that is substantially transparent when free of fibers. In certain aspects, the polymer may be a thermoset polymer selected from the group consisting of: benzoxazine, a bis-maleimide (BMI), a cyanate ester, an epoxy, a phenolic (PF), a polyacrylate (acrylic), a polyimide (PI), an unsaturated polyester, a polyurethane (PUR), a vinyl ester, a siloxane, co-polymers thereof, and combinations thereof. In certain aspects, the polymer may be a thermoplastic polymer selected from the group consisting of: polyethylenimine (PEI), polyamide-imide (PAI), polyamide (PA) (e.g., nylon 6, nylon 66, nylon 12), polyetheretherketone (PEEK), polyetherketone (PEK), a polyphenylene sulfide (PPS), a thermoplastic polyurethane (TPU), polypropylene (PP), polycarbonate/acrylonitrile butadiene styrene (PC/ABS), high-density polyethylene (HDPE), polyethylene terephthalate (PET), poly(methyl methacrylate) (PMMA), polycarbonate (PC), polyaryletherketone (PAEK), polyetherketoneketone (PEKK), co-polymers thereof, and combinations thereof. In certain aspects, the upper body component may include more than one polymer. In certain aspects, the upper body component may further include a substantially opaque polymer, such as in regions of lower or no transparency.

In certain aspects, the plurality of fibers (also referred to as "the fibers") may have lengths and/or orientations to meet desired strengths for the vehicle upper body component. In certain aspects, the fibers may be continuous and oriented in a substantially uniform direction, discontinuous and oriented in a substantially uniform direction, discontinuous and oriented in random directions, or any combination thereof. A length of a discontinuous fiber may be less than a length of a continuous fiber. The length of a discontinuous fiber may be greater than or equal to a critical length, such that when the upper body component is exposed to a tensile stress or a compressive stress a substantially complete load transfer may occur from the fiber to the polymer matrix. The critical length is material dependent. In one example, the critical length is about 97.5 μm for a glass fiber in an epoxy matrix. The substantially uniform direction may be in a first planar direction such that the upper body component has an increased strength in the first planar direction. The upper body component may optionally include more than one fiber orientation to achieve a desired mechanical strength and/or stiffness.

In certain aspects the fibers may have a substantially cylindrical shape, a substantially flat shape, or both a substantially cylindrical and a substantially flat shapes. The fiber shape may be defined by a length, a width, and a thickness. The fibers length may be greater than or equal to the critical length. In certain aspects, the length is about 10× longer than an effective diameter of the fiber.

The substantially flat shape may be defined by a first dimension, a second dimension, and a third dimension (e.g., a thickness). In certain aspects, the third dimension is less than the first dimension and/or the second dimension. In certain aspects the third dimension may be less than or equal to about 25% of the first dimension and/or second dimension, optionally less than or equal to about 20% of the first dimension and/or second dimension, optionally less than or equal to about 15% of the first dimension and/or second dimension, or optionally less than or equal to about 10% of the first dimension and/or second dimension. In one example, a substantially flat fiber has a first dimension of about 28 mm, a second dimension of about 7 mm, and a third dimension of about 3 mm.

In certain aspects, the upper body component may include a continuous fiber having a substantially cylindrical shape and substantially oriented in a first planar direction. In certain aspects, the upper body component may include a discontinuous fiber having a substantially cylindrical shape and substantially oriented in a first planar direction. In certain aspects, the upper body component may include a discontinuous fiber optionally having a substantially flat shape and substantially oriented in a first planar direction.

Suitable fiber materials may include carbon fibers (e.g., carbon black, carbon nanotubes, talc, fibers derived from polyacrylonitrile and/or pitch precursors), glass fibers (e.g., fiber glass, quartz), basalt fibers, aramid fibers (e.g., KEVLAR®, polyphenylene benzobisoxazole (PBO)), polyethylene fibers (e.g., high-strength ultra-high molecular weight (UHMW) polyethylene), polypropylene fibers (e.g., high-strength polypropylene), natural fibers (e.g., cotton, flax, cellulose, spider silk), and combinations thereof, by way of example.

In certain aspects, the upper body component may include the fibers in an amount greater than or equal to 5 volume percent, optionally greater than or equal to about 10 volume percent, optionally greater than or equal to about 20 volume percent, optionally greater than or equal to about 30 volume percent, optionally greater than or equal to about 35 volume percent or optionally greater than or equal to about 40 volume percent. In certain aspects, the upper body component may include fibers in an amount less than or equal to about 60 volume percent, optionally less than or equal to about 50 volume percent, optionally less than or equal to about 40 volume percent, or optionally less than or equal to about 30 volume percent.

In various aspects, the strength and transparency of the upper body component may be tailored to achieve a desired performance. In certain aspects, a volume percent, or volume fraction, of fibers may be substantially homogeneous across the upper body component. In certain other aspects, the upper body component may include a plurality of regions or zones. The volume percent of fibers of each region or zone may be the same or different such that the volume percent of fibers may vary across the upper body component.

In certain aspects, a region including a higher volume percent of fibers may include the fibers in an amount greater than or equal to 40 volume percent, optionally greater than or equal to 50 volume percent, or optionally greater than or equal to 60 volume percent. In certain aspects, a region including a lower volume percent of fibers may include the fibers in an amount less than or equal to about 40 volume percent, optionally less than or equal to about 30 volume percent, optionally less than or equal to about 20 volume percent, less than or equal to about 10 volume percent, or optionally less than or equal to 5 volume percent. The volume percent may be dependent strength and/or stiffness characteristics of the fiber material and may be selected to meet the desired strength and/or stiffness characteristics of the upper body component.

In certain aspects, the upper body component may include a high-strength region (or optionally multiple high-strength regions), where a high stiffness and/or strength is desired, such as due to expected loads. The high-strength region may include higher volume percent of fibers compared to other regions.

In certain aspects, the upper body component may include a high-transparency region (or optionally multiple high-transparency regions), where a high transparency is desired. The high-transparency region may include a lower volume percent of fibers compared to other regions.

A region having a high volume percent of fibers, such as greater than or equal to about 10 volume percent fibers to less than or equal to 40 volume percent fibers (or optionally greater than or equal to about 40 volume percent fibers), may have a higher tensile strength compared to a region having a low volume percent of fibers (e.g., less than or equal to about 10 volume percent fibers, or optionally free of fibers). However, the region having the high volume percent of fibers may have a lower transparency compared to the region having the low volume percent of fibers. In certain aspects, the region having the high volume percent of fibers may be at least partially transparent. In certain aspects, the region having the substantially high volume percent of fibers may be substantially opaque.

In various aspects, the strength and transparency of the upper body component may be tailored through polymer and/or fiber selection. In certain aspects, each region may include the same polymer and/or fiber. In certain other aspects, each region may include a different polymer and/or fiber. In certain aspects, a region may include a polymer that is substantially free of fibers (e.g., when a high transparency is desired). The polymer that is substantially free of fibers may be the same or different from the polymer of a region including both the polymer and fibers. Any combination of polymers including any combination of fibers may be utilized and configured to provide desired strength and transparency characteristics of the upper body component.

In various aspects, the strength of the upper body component may be tailored by fiber orientation. In certain aspects, continuous fibers may be oriented in a planar direction (e.g., by a uni-directional pre-impregnation forming process) (also referred to as "continuous, uni-directional fibers"). The continuous, uni-directional fibers may have a high strength in the planar direction. However, the continuous uni-directional fibers may have a relatively lower strength in a non-planar direction. In an example, the continuous, uni-directional fibers may be included in an upper body component where a desired strength and/or stiffness is in a substantially planar direction.

In certain aspects, the fibers may be discontinuous and oriented in multiple directions (e.g., oriented in random directions) (also referred to as "discontinuous, random in-plane fibers"). In an example, the discontinuous, random in-plane fibers may be included in an upper body component where a desired strength and/or stiffness is in multiple directions.

In certain aspects, the fibers may be discontinuous and oriented in a planar direction (also referred to as "discontinuous, oriented in-plane fibers"). Fibers oriented in the planar direction may have an increased strength in the planar direction. However, in various aspects, the strength characteristics of the upper body component including discontinuous, oriented in-plane fibers may be tailored by the shape of the fiber.

In certain aspects, a substantially flat fiber may have an increased surface area compared to a substantially cylindrical fiber. The increased surface area may increase the component strength in a second direction (e.g., an increased strength in a direction substantially perpendicular to the direction of fiber orientation). Accordingly, an upper body component including the substantially flat fiber may have an increased strength in more than one direction compared to an upper body component including the substantially cylindrical fiber.

In various aspects, the shape of the fiber may also be utilized to tailor the transparency of an upper body component. The substantially flat fiber may have a lower curvature surface compared to the substantially cylindrical fiber. The lower curvature surface may increase the transparency (e.g., the lower curvature of the substantially flat fiber may decrease the amount of light distortion). Accordingly, the upper body component including the substantially flat fiber may have an increased transparency compared to the upper body component including the substantially cylindrical fiber. Fiber orientation and shape may be varied and/or combined as needed to provide the strength and transparency characteristics desired at different areas of the upper body component.

In various aspects the strength and transparency of the upper body component may be tailored by component thickness. In certain aspects, in regions where a higher strength and lower transparency is desired, the upper body component may have an increased thickness, such as a thickness greater than or equal to about 2 mm, optionally greater than or equal to about 4 mm, optionally greater than or equal to about 6 mm, or optionally greater than or equal to about 8 mm. The increased thickness may be less than or equal to about 10 mm, optionally less than or equal to 8 mm, optionally less than or equal to about 6 mm, or optionally less than or equal to about 4 mm. In certain aspects, in regions where a lower strength and higher transparency is desired, the upper body component may have a decreased thickness, such as a thickness greater than or equal to about 1 mm, optionally greater than or equal to about 2 mm, optionally greater than or equal to about 3 mm, optionally greater than or equal to about 4 mm, optionally greater than or equal to about 5 mm, optionally greater than or equal to about 6 mm, or optionally greater than or equal to about 7 mm. The decreased thickness may be less than or equal to about 8 mm, optionally less than or equal to about 7 mm, optionally less than or equal to about 6 mm, optionally less than or equal to about 5 mm, optionally less than or equal to about 4 mm, optionally less than or equal to about 3 mm, or optionally less than or equal to about 2 mm. The thickness may vary as needed to provide structural support, strength and/or transparency at desired areas of the upper body component.

In various aspects, the upper body component may include one or more additives to achieve desired characteristics. In certain aspects, certain characteristics of the polymer of the upper body component may change over time with exposure to UV light from the sun. In certain aspects, the polymer may include an additive (e.g., a chemical group) configured to absorb UV light. The polymer may include a chromophore. In certain aspects, the polymer may include a halogenated flame retardant, a filler, a pigment, and/or combinations thereof. In certain aspects, the polymer may include a plurality of additives. The additives may include a UV absorber, a quencher, a hindered amine light stabilizer (HALS), or any combination thereof. In certain aspects, the additives may be added in an amount that does not substantially impede a desired transparency.

In certain aspects, the UV absorber may be configured to dissipate heat through the polymer (e.g., change UV radiation into infrared radiation). In certain aspects, the UV absorber includes carbon black, rutile titanium oxide, hydroxybenzophenone, hydroxyphenylbenzotriazole, oxanilides (e.g., in an upper body component including PA), benzophenones (e.g., in an upper body component including PVC), benzotriazoles (e.g., in an upper body component including PC), hydroxyphenyltriazines (e.g., in an upper body component including PC), or combinations thereof.

In certain aspects, during UV light exposure a chromophore may gain energy from UV light and change energy states from a lower energy ground state to a higher energy excited state. In certain aspects, the quencher may be configured to return the chromophore from the higher energy excited state to the lower energy ground state. In certain aspects the quencher includes the element nickel (Ni).

In certain aspects, the HALS may be configured to trap free radicals formed during UV light exposure. HALS may include a 2, 2, 6, 6-tetramethylpiperidine ring structure. In certain aspects, the additive may include a combination of UV absorbers, quenchers, and/or HALS to achieve desired strength, transparency and color pigmentation characteristics.

In certain aspects, the upper body component may be formed by compression molding. In certain other aspects the upper body component may be formed by injection molding. In certain aspects, the molding process may utilize a pre-formed pre-impregnated polymer, a pre-formed polymer free of fibers (e.g., dry-fiber pre-form), or both a pre-formed pre-impregnated polymer and a pre-formed polymer free of fibers.

Referring to FIG. 1, an upper body structure 100 for a vehicle according to various aspects of the present disclosure is provided. The upper body structure 100 may at least partially define an upper periphery of a vehicle passenger compartment 102. The upper body structure 100 includes a pair of substantially laterally spaced A-pillars 104 and a pair of roof rails 106. The roof rails may include a driver-side roof rail 108 and a passenger-side roof rail 110. The A-pillars 104 may be substantially parallel and may project substantially forward in vehicle. The roof rails 106 may be secured to or integrally formed with the respective A-pillars 104. The roof rails 106 may extend substantially rearward along a fore-aft length 112 of the vehicle. Alternative vehicle architectures may include additional structural pillars (not shown). The pillars may optionally include a pair of B-pillars, a pair of C-pillars, and optionally a pair of D-pillars. The pillars may extend substantially perpendicularly from the roof rails 106 and may be configured to join the upper body structure 100 to a lower body structure (not pictured), further defining the passenger compartment 102.

A roof 120 may be at least partially disposed between the roof rails 106. The roof 120 may extend substantially laterally across a cross-car length 122 of the vehicle and substantially longitudinally across the fore-aft length 112 of the vehicle. The roof 120 may be configured to provide structural support, occupant visibility, and shield occupants from rain, snow, UV light, and other elements.

A front header 130 (also referred to as "the header 130") may be at least partially disposed between and extend substantially orthogonally to the roof rails 106. A rear header 132 may be at least partially disposed between and extend substantially orthogonally to the roof rails 106. The front header 130 may be configured to couple the driver-side roof rail 108 to the passenger-side roof rail 110 at the substantially forward A-pillars 104. The rear header 132 may be configured to couple the roof rails 106 substantially rearward in vehicle. The front header 130 and the rear header 132 may extend across the cross-car length 122 of the roof 120. The front header 130 may be configured to couple the roof 120 to a windshield 134.

In certain aspects, as shown in FIG. 1, the upper body structure 100 is free of cross-car reinforcement members. In certain other aspects, the upper body structure 100 may optionally further include one or more cross-car reinforcement members (not shown). The cross-car reinforcement members may extend substantially orthogonally between the roof rails 106. The cross-car reinforcement members may be spaced longitudinally across the fore-aft length 112 as needed to provide structural support and/or strength for the upper body structure 100.

According to various aspects of the present disclosure, one or more components of the upper body structure 100 may be at least partially transparent (i.e., one or more regions may have a transparency of greater than 0%). In certain aspects, a portion of the upper body structure may be substantially opaque. In certain aspects, the roof 120 may be at least partially transparent, as described below in the discussion accompanying FIGS. 2-4. In certain aspects, the header 130 may be at least partially transparent, as described below in the discussion accompanying FIGS. 5-9. In certain aspects, both the header 130 and the roof 120 may be at least partially transparent.

Figure 2:
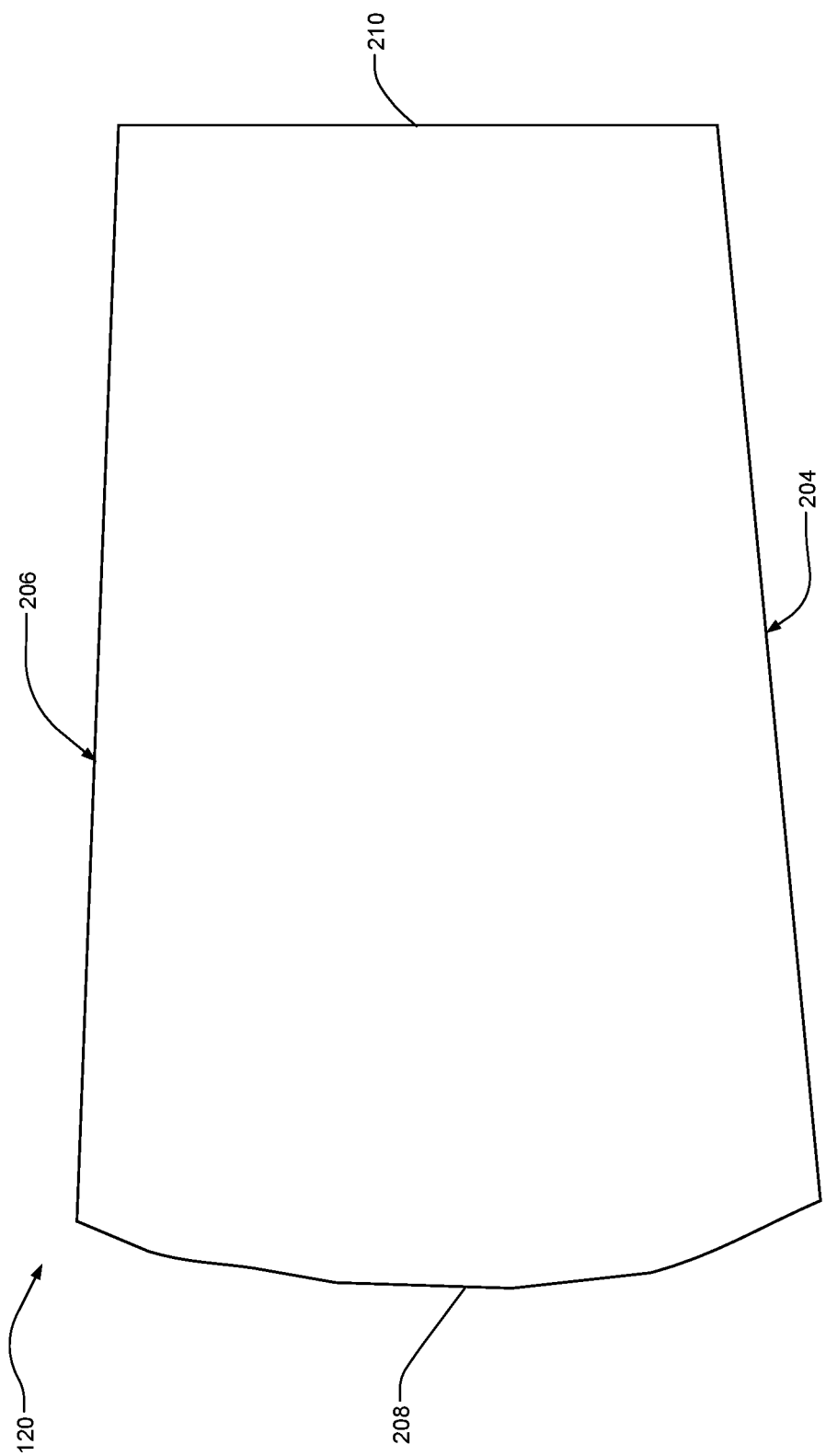
FIG. 2 is a top view of the roof of FIG. 1 according to various aspects of the present disclosure.

Referring to FIG. 2, the roof 120 includes a body 202. The body 202 extends substantially transversely between a first side 204 and a second side 206 (also referred to as "the sides 204, 206"). The sides 204, 206 may be configured to join each of the roof rails 106. The body 202 may extend substantially longitudinally between a front end 208 and a back end 210 (also referred to as "the ends 208, 210"). The front end 208 may be configured to be coupled to the header 130. In certain aspects, the front end 208 may be configured to be directly coupled to the header 130. The rear end 210 may be configured to be coupled to the rear header 132. In certain aspects, the rear end 210 may be configured to be directly coupled to the rear header 132.

In various aspects, a roof according to various aspects of the present disclosure may have a tailored strength and transparency. In certain aspects, the roof may have a uniform strength and transparency. In certain other aspects, the roof may include multiple regions or zones having different strengths and transparencies. By way of example, the roof may have a first region having a first strength and first transparency, and a second region having a second strength and second transparency that is different from the first strength and first transparency. The roof may optionally include more than two regions of varying strength and transparency, such as optionally greater than or equal to three regions, optionally greater than or equal to five regions, optionally greater than or equal to ten regions, or optionally greater than or equal to fifteen regions. In certain aspects, the roof may include a gradient, or multiple gradients of transparencies.

Figure 3:
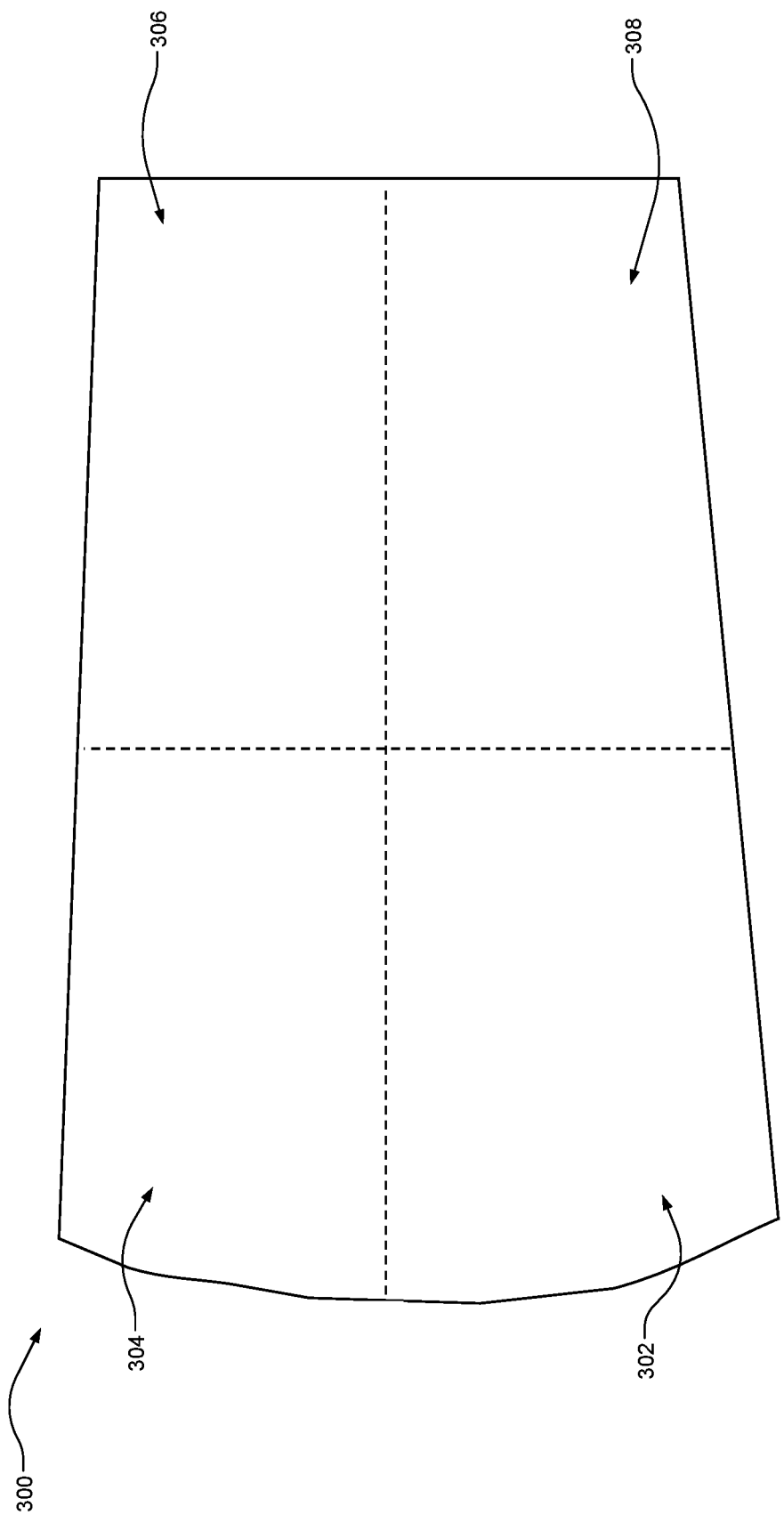
FIG. 3 is a top view of another roof according to various aspects of the present disclosure.

With reference to FIG. 3, a roof 300 of an upper body structure, which may be similar to the upper body structure 100 of FIG. 1 except for the roof 300, according to various aspects of the present disclosure is provided. The roof 300 may be the same as the roof 120 of FIGS. 1-2 except as described below. In certain aspects, the roof 300 may include a first region 302, a second region 304, a third region 306, and a fourth region 308 (also referred to as "the regions 302, 304, 306, 308"). In certain aspects, a transparency and a strength of each of the regions 302, 304, 306, 308 may be substantially equal.

In certain other aspects, a transparency and/or a strength of each of the regions 302, 304, 306, 308 may be different. For example, the first region 302 may have a first transparency that is greater than or equal to about 10% to less than or equal to about 20% (e.g., about 15%). The second region 304 may have a second transparency that is greater than or equal to about 40% to less than or equal to about 10% (e.g., about 4%). The third region 306 may have a third transparency that is greater than or equal to about 20% to less than or equal to about 40% (e.g., about 30%). The fourth region 308 may have a transparency that is greater than or equal to about 50% to less than or equal to about 70% (e.g., about 60%).

In certain other aspects, all or a portion of the regions 302, 304, 306, 308 may be similar to or the same as the other regions 302, 304, 306, 308 of the roof 300 in terms of transparency and/or strength. In one example, the first and second regions 302, 304 have the same or similar transparencies and/or strengths and the third and fourth regions 306, 308 have the same or similar transparencies and/or strengths. In certain other aspects, all or a portion of the regions may have different geometries (e.g., shape, size, and/or location), and/or arrangements. Any combination of regions including any combination of strengths and transparencies may be utilized and arranged to provide desired strength and transparency characteristics of the upper body assembly.

Figure 4:
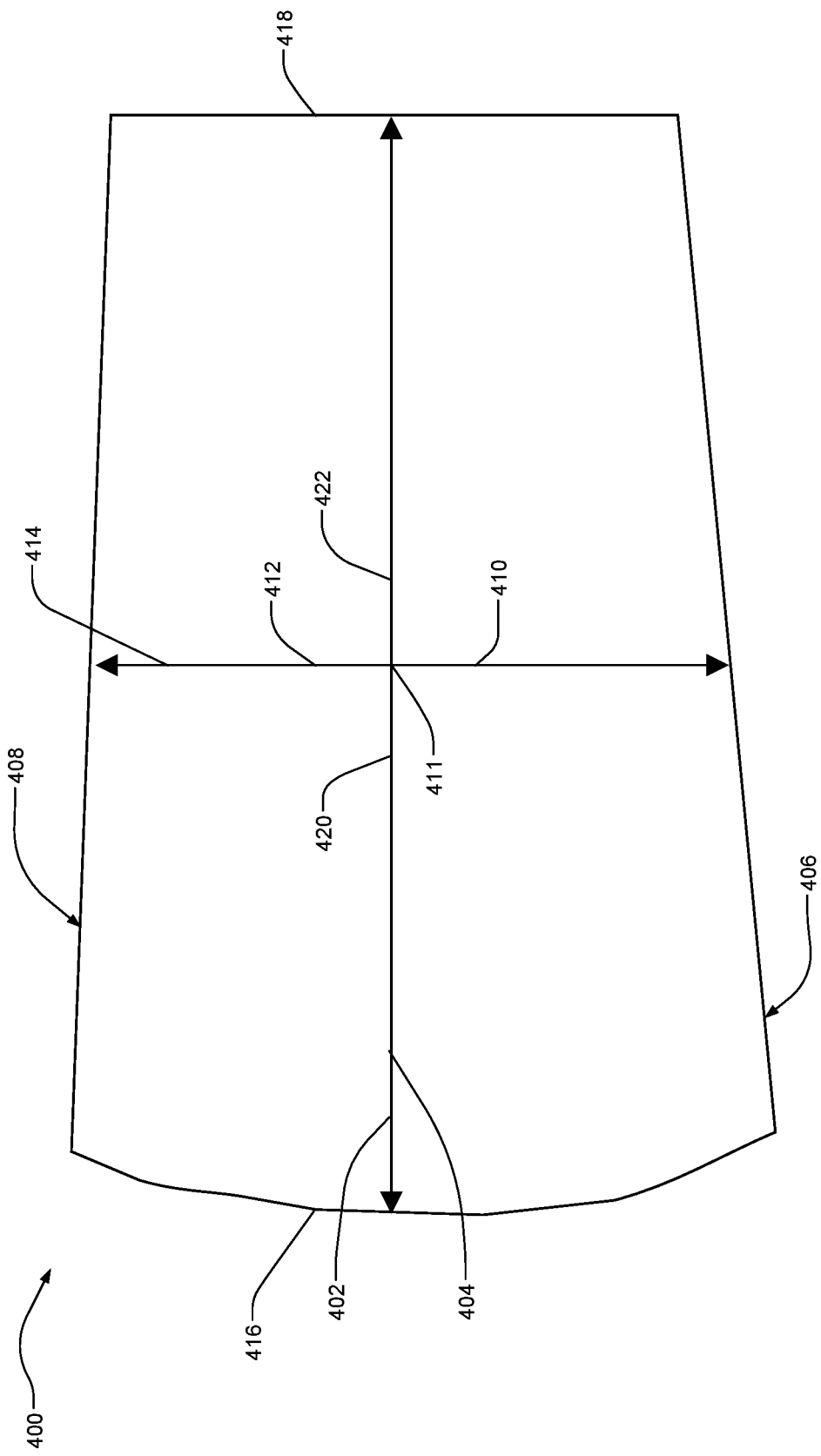
FIG. 4 is a top view of another roof according to various aspects of the present disclosure.

Referring to FIG. 4, a roof 400 according to various aspects of the present disclosure is provided. The roof 400 may be the same as the roof 120 of FIGS. 1-2 except as described below. In certain aspects, the roof 400 may include a gradient 402. In certain aspects the gradient 402 may be a strength gradient. In certain aspects, the gradient 402 may be a transparency gradient. In certain aspects, the gradient 402 may be both a strength and transparency gradient. In certain aspects, strength may increase as transparency decreases, and strength may decrease as transparency increases.

In certain aspects, the roof 400 may include more than one gradient (e.g., gradients in different locations and/or in different directions) such as greater than or equal to two gradients, optionally greater than or equal to three gradients, optionally greater than or equal to four gradients, optionally greater than or equal to five gradients, or optionally greater than or equal to ten gradients. The additional gradients may have the same or different strength characteristics and/or transparency characteristics.

In certain aspects, the gradient 402 may include a first gradient 404 extending from a first side 406 to a second side 408 (also referred to as "the sides, 406, 408"). As shown in FIG. 4, the first gradient 404 may optionally include a first side gradient 410 that is mirrored about a lateral center 411 (also referred to as "the center 411") of the roof 400 to a second side gradient 412. In certain aspects, the gradient 402 may optionally include a second gradient 414 extending from a front end 416 to a back end 418 (also referred to as "the ends 416, 418"). The second gradient 414 may optionally include a front end gradient 420 and a back end gradient 422 as shown in FIG. 4. In certain aspects the gradient 402 may include both the first gradient 404 and the second gradient 414. In certain aspects, the gradient 402 includes all of the gradients 410, 412, 420, and 422.

In certain aspects, the center 411 of the roof 400 may have a first strength and a first transparency. The sides 406, 408 may have a second strength that is higher than the first strength and a second transparency that is lower than the first transparency. The second side 408 may have a strength and transparency that is substantially equal to the first side 406. The gradient 402 including the first side gradient 410 and the second side gradient 412 may have substantially equal rates of change between the strength and transparency of the center 411 to the respective sides 406, 408. In certain other aspects, the first side gradient 410 and the second side gradient 412 may have different rates of change between the strength and transparency of the center 411 to the respective sides 406, 408.

In certain aspects, the center 411 of the roof 400 may have a third strength and a third transparency and the ends 416, 418 may have a fourth strength that is higher than the third strength and a fourth transparency that is lower than the third transparency. The third strength may be the same as the first strength, and the third transparency may be similar to the first transparency. In certain aspects, the fourth strength may be similar to or the same as the second strength. In certain aspects, the fourth transparency may be the similar to or the same as the second transparency. The back end 418 may have a strength and transparency that is substantially equal to the front end 416. The gradient 402 including the front end gradient 420 and the back end gradient 422 may have substantially equal rates of change between the strength and transparency of the center 411 to the respective ends 416, 418. In certain other aspects, the front end gradient 420 and the back end gradient 422 may have different rates of change between the strength and transparency of the center 411 to the respective sides 416, 418.

In certain other aspects, a roof may have only one of the first and second gradients 404, 414. In certain other aspects, a roof may have one or more different gradients in addition to or as an alternative to the first and second gradients 404, 414. Any configuration and arrangement of gradients may be utilized to achieve the desired strength and transparency characteristics of the roof 400.

Referring to FIGS. 5A-5B, the header 130 of the upper body structure 100 (FIG. 1) includes an elongated body 540. The elongated body 540 extends between a first side 542 and a second side 544 (also referred to as "the sides 542, 544"). The elongated body 540 may include a front end 546 and a back end 548 (also referred to as "the ends 546, 548"). The sides 542, 544 may be configured to be coupled to the driver-side roof rail 108 (FIG. 1) and the passenger-side roof rail 110 (FIG. 1), respectively.

The windshield 134 (FIG. 1) may have a glass curvature (not shown) as desired to meet the architectural design of the vehicle. The header 130 may have a curvature that is substantially similar to the glass curvature. The header 130 may have different geometries (e.g., shape and/or curvature), features (e.g., outer edges and/or formations), and configurations as needed to meet desired mechanical performance characteristics of the upper body structure 100.

The header 130 may be configured to couple the windshield 134 to the roof 120. In certain aspects, as shown in FIG. 5B, the header 130 may be directly coupled to the roof 120 by an adhesive 552. The adhesive 552 may be a transparent adhesive (e.g., a polyurethane adhesive). In certain aspects, the header 130 may be directly coupled to the roof 120 by a mechanical fastener (not shown), in addition to or as an alternative to the adhesive.

In certain aspects (not shown), the header 130 may be directly coupled to both the windshield 134 and the roof 120. The front end 546 may be configured to be coupled to the windshield 134. The back end 548 may be configured to be coupled to the roof 120.

Referring back to FIG. 5B, in certain aspects, the header 130 may include a first component 554 and a second component 556 (also referred to as "the components 554, 556"). The components 554, 556 may be individually formed (e.g., molded). The components 554, 556 may be coupled to one another. In certain aspects, the components 554, 556 are directly coupled together by an adhesive (e.g., a transparent polyurethane adhesive) and/or welds. In certain aspects, the header 130 may include more than two components, such as greater than or equal to three components, optionally greater than or equal to four components, or optionally greater than or equal to five components. In certain other aspects, the header 130 may be a single-piece, unitary component.

A header according to various aspects of the present disclosure may have a tailored strength and transparency, as described above. In certain aspects, the header may have a uniform strength and transparency. In certain other aspects, the header may include multiple regions or zones having different strengths and transparencies. By way of example, the header may have a first region having a first strength and first transparency and a second region having a second strength and second transparency that is different from the first strength and first transparency. In certain aspects, the header may include more than two regions of varying strength and/or transparency, such as greater than or equal to three regions, optionally greater than or equal to five regions, optionally greater than or equal to ten regions, or optionally greater than or equal to fifteen regions. In certain aspects, the header may include a gradient, or multiple gradients, of transparencies and/or strengths.

With reference to FIGS. 6A-6B, a header 600 of an upper body structure, which may be similar to the upper body structure 100 of FIG. 1 except for the header 600, according to various aspects of the present disclosure is provided. The header 600 may be the same as the header 130 of FIG. 1 and FIGS. 5A-5B except as described below. The header 600 may include a first region 602. The header 600 may include one or more sub-regions, such as a first outer region 604 and a second outer region 606 (also referred to as "the outer regions 604, 606"). The first region 602 may extend from a first side 608 to a second side 610. The outer regions 602, 604 may include the first side 608 and the second side 610, respectively. The outer regions 602, 604 may include a front end 612 and a back end 614.

In certain aspects, as best shown in FIG. 6B, the first region 602 includes a polymer 616 and a plurality of fibers 618 (e.g., high-strength fibers such as continuous fibers). The plurality of fibers 618 (also referred to as "the first fibers 618") may be included at a volume percent that is greater than or equal to about 10%, by way of example. The first fibers 618 may be locally placed (e.g., by tape) around a periphery 620 of the header 600. In certain aspects, the first fibers 618 may be placed locally towards the front end 612 and the back end 614. The first fibers 618 may form a plurality of tow-lines 626 that extend between the first side 608 and the second side 610. The placement of the first fibers 618 on the periphery 620 and/or tow-lines 626 may form an inner area 628 that is substantially free of fibers.

The outer regions 604, 606 may include the polymer 616, the first plurality of first fibers 618, and a second plurality of fibers 630 (also referred to as "the second fibers 630"). In certain aspects, the second fibers 630 may be present at a volume percent of the outer regions 604, 606 that is higher that the volume percent of the first fibers 618 in the first region 602. In certain aspects, the outer regions 604, 606 include a second polymer that is different from the polymer 616. The second polymer may optionally be opaque.

In certain aspects, the first fibers 618 of the first region 602 may be discontinuous. The second fibers 630 of the outer regions 604, 606 may be continuous. The discontinuous fibers may be randomly oriented, oriented in a planar direction, or both randomly oriented and oriented in a planar direction. The continuous fibers may be oriented in a planar direction. In certain aspects, the first fibers 618 may be continuous along the periphery of the first region 602. The first fibers 618 and the second fibers 630 may be oriented the same or different to meet desired performance characteristics.

In certain aspects, the header 600 may have a higher strength in the outer regions 604, 606 than a remainder of the header 600. At least a portion of the first region 602 may have a lower strength compared to the strength of the outer regions 604, 606.

In certain aspects, the header 600 may have the highest transparency in the inner area 628 that is substantially free of fibers. The outer regions 604, 606 may have a lower transparency compared to the transparency of the inner area 628. In certain aspects, the tow-lines 626 in the first region 602 may be substantially opaque due to the local placement of the first fibers 618 on the periphery 620.

Figure 7A:
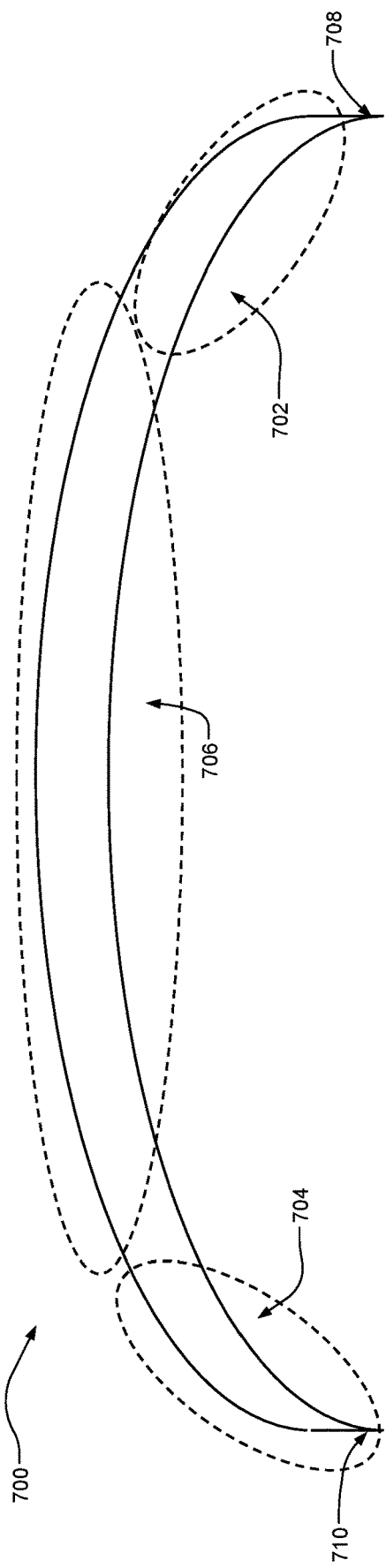
FIG. 7A is a top view of another header according to various aspects of the present disclosure.
Figure 7B:
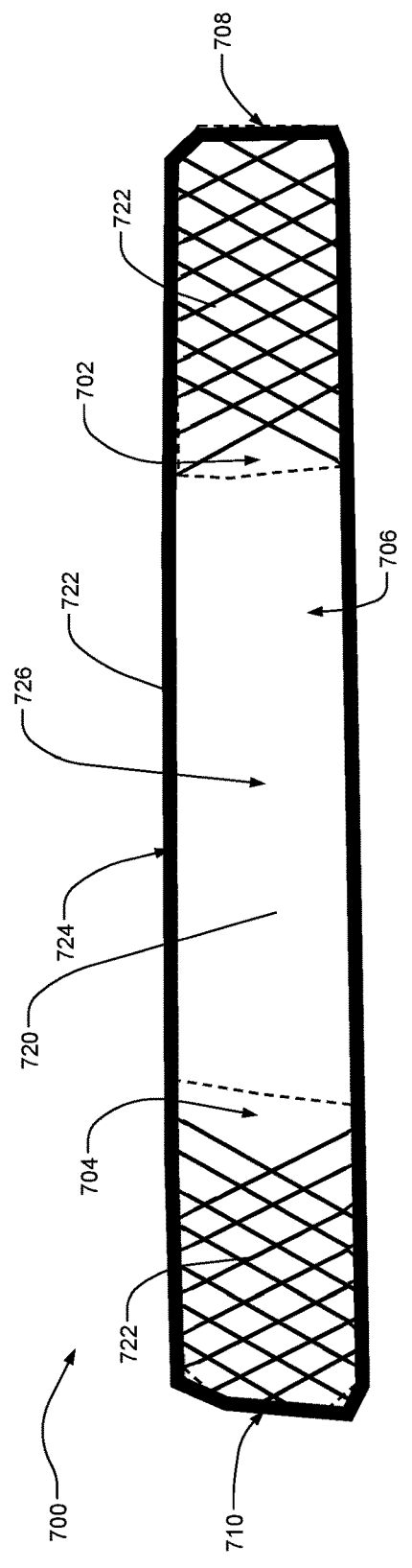
FIG. 7B is a schematic view of the header of FIG. 7A.

Referring to FIGS. 7A-7B, a header 700 of an upper body structure, which may be similar to the upper body structure 100 of FIG. 1 except for the header 700, according to various aspects of the present disclosure is provided. The header 700 may be the same as the header 130 of FIG. 1 and FIGS. 5A-5B except as described below. The header 700 may include a first outer region 702, a second outer region 704 (also referred to as "outer regions 702, 704"), and an inner region 706. The first outer region 702 may include a first side 708. The second outer region 704 may include a second side 710. The inner region 706 may be at least partially disposed between the first outer region 702 and the second outer region 704.

In certain aspects, as best shown in FIG. 7B, the outer regions 702, 704 and the inner region 706 may include a polymer 720 and a plurality of fibers 722. The fibers 722 of the inner region 706 may be locally formed around a periphery 724 of the header 700. The inner region 706 may have a localized area 726 that is substantially free of fibers. The localized area 726 may be coextensive with the inner region 706. In certain aspects, the outer regions 702, 704 may include a higher volume percent of the fibers 722 compared to the inner region 706. The volume percent of the fibers 722 in the first outer region 702 may be substantially equal to the volume percent of the fibers 722 of the second outer region 704.

The outer regions 702, 704 may have a first strength and first transparency. The inner region 706 may have a second strength and second transparency. The second strength of the inner region 706 may be less than the first strength of the outer regions 702, 704. The inner region 706 may have a higher transparency than the outer regions 702, 704.

Figure 8A:
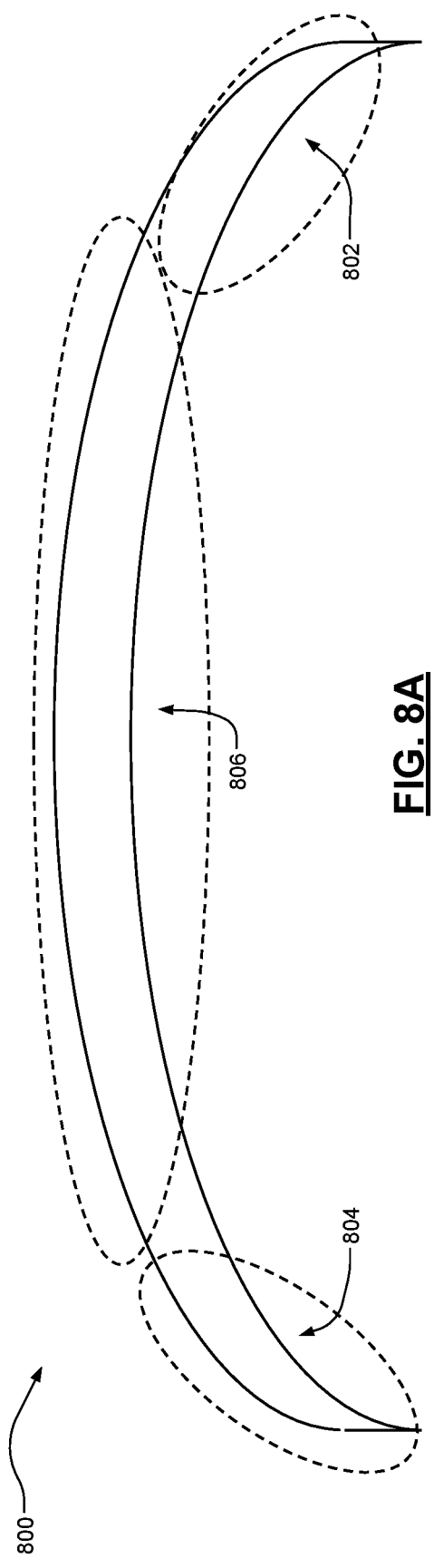
FIG. 8A is a top view of another header according to various aspects of the present disclosure.
Figure 8B:
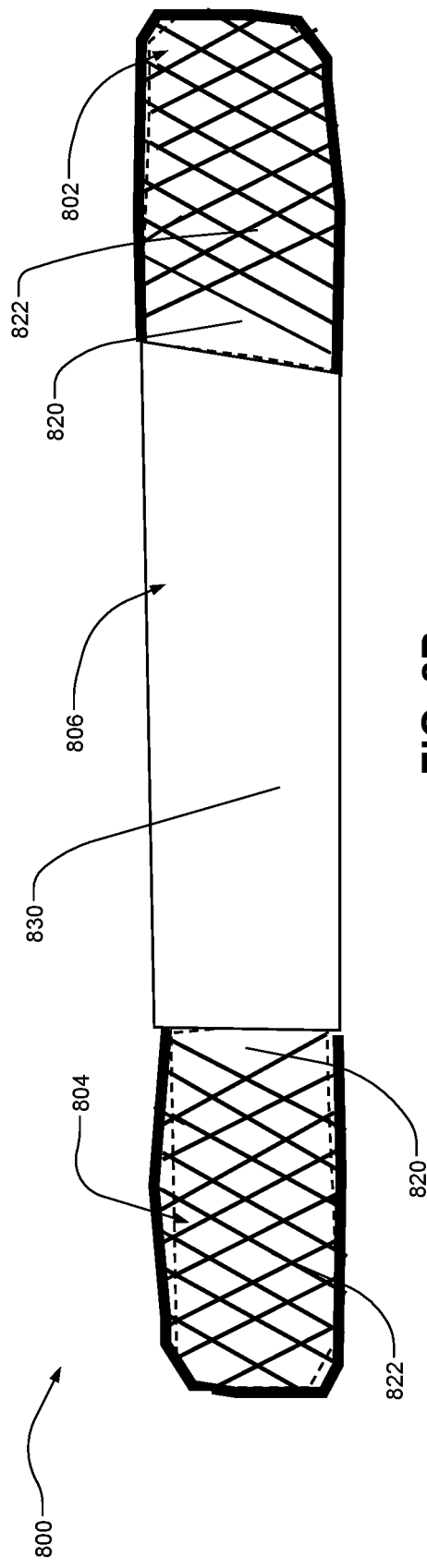
FIG. 8B is a schematic view of the header of FIG. 8A.

With reference to FIGS. 8A-8B, a header 800 of an upper body structure, which may be similar to the upper body structure 100 of FIG. 1 except for the header 800, according to various aspects of the present disclosure is provided. The header 800 may be the same as the header 700 of FIGS. 7A-7B except as described below. The header 800 may include a first outer region 802, a second outer region 804 (also referred to as "outer regions 802, 804"), and an inner region 806.

In certain aspects, as best shown in FIG. 8B, the outer regions 802, 804 may be constructed of a first polymer 820 and a first plurality of fibers 822. In certain aspects, the volume percent of the fibers 822 of the first outer region 802 is substantially equal to the volume percent of fibers 822 of the second outer region 804. The inner region 806 may be constructed of a second polymer 830 that is free of fibers. The second polymer 830 may be the same or different from the first polymer 820.

The outer regions 802, 804 may have a higher strength than the inner region 806. In certain aspects, the outer regions 802, 804 may be at least partially transparent, however, the inner region 806 may have a higher transparency than the outer regions 802, 804. In certain aspects, the outer regions 802, 804 may be substantially opaque. In certain aspects, the inner region 806 that is substantially free of fibers may be substantially transparent.

Figure 9:
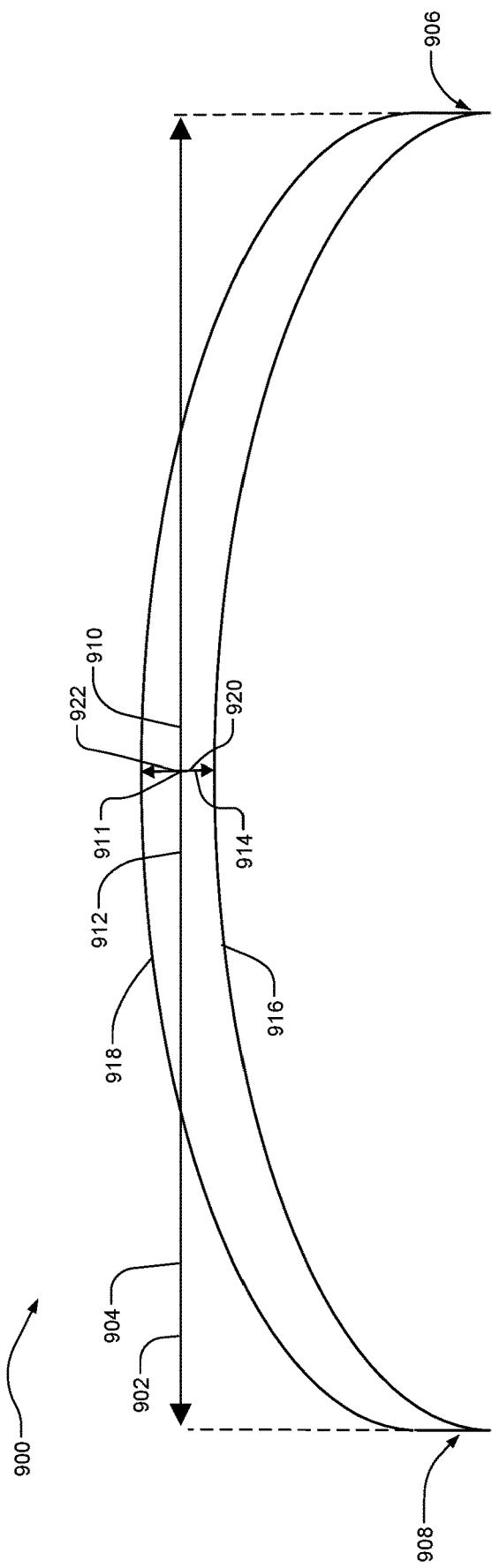
FIG. 9 is a perspective view of another header according to various aspects of the present disclosure.

Referring to FIG. 9, a header 900 according to various aspects of the present disclosure is provided. The header 900 may be the same as the header 130 of FIG. 1 and FIGS. 5A-5B except as described below. In certain aspects, the header 900 may include a gradient 902. In certain aspects the gradient 902 may be a strength gradient. In certain aspects, the gradient 902 may be a transparency gradient. In certain aspects, the gradient 902 may be both a strength and transparency gradient. In certain aspects, strength may increase as transparency decreases, and strength may decrease as transparency increases.

In certain aspects, the header 900 may include more than one gradient (e.g., gradients in different locations and/or in different directions) such as greater than or equal to two gradients, optionally greater than or equal to three gradients, optionally greater than or equal to four gradients, optionally greater than or equal to five gradients, or optionally greater than or equal to ten gradients. The additional gradients may have the same or different strength and/or transparency characteristics.

In certain aspects, the gradient 902 may include a first gradient 904 extending from a first side 906 to a second side 908 (also referred to as "the sides, 906, 908"). As shown in FIG. 9, the first gradient 904 may optionally include a first side gradient 910 that is mirrored about a lateral center 911 (also referred to as "the center 911") of the header 900 to a second side gradient 912. In certain aspects, the gradient 902 may optionally include a second gradient 914 extending from a front end 916 to a back end 918 (also referred to as "the ends 916, 918"). The second gradient 914 may optionally include a front end gradient 920 and a back end gradient 922 as shown in FIG. 9. In certain aspects the gradient 902 may include both the first gradient 904 and the second gradient 914. In certain aspects, the gradient 902 includes all of the gradients 910, 912, 920, and 922.

In certain aspects, the center 911 of the header 900 may have a first strength and a first transparency. The sides 906, 908 may have a second strength that is higher than the first strength and a second transparency that is lower than the first transparency. The second side 908 may have a strength and transparency that is substantially equal to the first side 906. The gradient 902 including the first side gradient 910 and the second side gradient 912 may have substantially equal rates of change between the strength and transparency of the center 911 to the respective sides 906, 908. In certain other aspects, the first side gradient 910 and the second side gradient 912 may have different rates of change between the strength and transparency of the center 911 to the respective sides 906, 908.

In certain aspects, the center 911 of the header 900 may have a third strength and a third transparency and the ends 916, 918 may have a fourth strength that is higher than the third strength and a fourth transparency that is lower than the third transparency. The third strength may be the same as the first strength, and the third transparency may be similar to the first transparency. In certain aspects, the fourth strength may be similar to or the same as the second strength. In certain aspects, the fourth transparency may be the similar to or the same as the second transparency. The back end 918 may have a strength and transparency that is substantially equal to the front end 916. The gradient 902 including the front end gradient 920 and the back end gradient 922 may have substantially equal rates of change between the strength and transparency of the center 911 to the respective ends 916, 918. In certain other aspects, the front end gradient 920 and the back end gradient 922 may have different rates of change between the strength and transparency of the center 911 to the respective ends 916, 918.

In certain other aspects, a header may have only one of the first and second gradients 904, 914. In certain other aspects, a header may have one or more different gradients in addition to or as an alternative to the first and second gradients 904, 914. Any configuration and arrangement of gradients may be utilized to achieve the desired strength and transparency characteristics of the header 900.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A roof for a vehicle upper body structure comprising:
  a unitary body extending between a first side and a second side and extending between a front end and a back end, the unitary body comprising,
    a polymer and a plurality of fibers,
    the front end configured to be coupled to a header,
    a first region having a first transparency, a first tensile strength, and a first volume percent of fibers, and a second region having a second transparency, a second tensile strength, and a second volume percent of fibers,
wherein:
the first transparency is less than the second transparency,
the first tensile strength is greater than the second tensile strength,
the first volume percent of fibers is greater than the second volume percent of fibers, and
at least a portion of the unitary body has a transparency of greater than or equal to about 4%.

2. The roof of claim 1, wherein the transparency is greater than or equal to about 50% to less than or equal to about 99%.

3. The roof of claim 1, wherein a volume percent of the plurality of fibers is greater than or equal to about 5 volume percent to less than or equal to about 35 volume percent.

4. The roof of claim 1, wherein a local tensile strength of the unitary body is greater than or equal to about 40 MPa.

5. The roof of claim 1, wherein at least a portion of the unitary body is free of fibers.

6. The roof of claim 1, wherein the plurality of fibers is dispersed substantially homogeneously throughout at least one of the first region and the second region.

7. The roof of claim 1, wherein:
the first region defines a first thickness,
the second region defines a second thickness, and
the first thickness is greater than the second thickness.

8. The roof of claim 1, wherein the unitary body further includes a third region having a third transparency and a third tensile strength.

9. The roof of claim 8, wherein the unitary body further includes a fourth region having a fourth transparency and a fourth tensile strength.

10. The roof of claim 1 wherein the unitary body defines a transparency gradient.

11. The roof of claim 10, wherein the transparency gradient comprises a plurality of transparency gradients.

12. The roof of claim 11, wherein the plurality of transparency gradients includes a first gradient and a second gradient having a substantially equal rate of change to the first gradient.

13. The roof of claim 1, wherein:
the polymer is selected from the group consisting of: an epoxy, a polyurethane (PUR), a polycarbonate (PC), a polymethyl methacrylate (PMMA), a polyethylene terephthalate (PET), a polyacrylate (acrylic), a polyamide (PA), co-polymers thereof, and combinations thereof; and
the plurality of fibers is selected from the group consisting of: glass fibers, carbon fibers, basalt fibers, aramid fibers, polyethylene fibers, polypropylene fibers, natural fibers, or any combination thereof.

14. The roof of claim 1, wherein:
the plurality of fibers have a shape selected from the group consisting of: cylindrical, flat, or both cylindrical and flat, and
the plurality of fibers have an orientation selected from the group consisting of: continuous in a first planar direction, discontinuous in a first planar direction, discontinuous in a plurality of directions, or any combination thereof.

15. The roof of claim 1, wherein the plurality of fibers includes a plurality of continuous fibers and a plurality of discontinuous fibers.

16. The roof of claim 1, wherein the unitary body further comprises an additive selected from the group consisting of: ultraviolet (UV) absorbers, quenchers, hindered amine light stabilizers (HALS), or combinations thereof.

17. An upper body structure comprising:
a first side structure;
a second side structure;
a header;
a roof; and
the roof comprising a unitary body extending between a first side and a second side and extending between a front end and a back end, the unitary body comprising,
a polymer and a plurality of fibers,
the front end configured to be coupled to the header,
the first side configured to be coupled to the first side structure,
the second side configured to be coupled to the second side structure,
a first region having a first transparency, a first tensile strength, and a first volume percent of fibers, and
a second region having a second transparency, a second tensile strength, and a second volume percent of fibers,
wherein:
the first transparency is less than the second transparency,
the first tensile strength is greater than the second tensile strength,
the first volume percent of fibers is greater than the second volume percent of fibers, and
at least a portion of the unitary body has a transparency of greater than or equal to about 4%.

18. A roof for a vehicle upper body structure comprising:
a unitary body extending between a first side and a second side and extending between a front end and a back end, the body comprising,
a polymer and a plurality of fibers,
a first region having a first transparency, a first tensile strength, and a first volume percent of fibers, and
a second region having a second transparency, a second tensile strength, and a second volume percent of fibers,
wherein:
the first transparency is less than the second transparency,
the first tensile strength is greater than the second tensile strength,
the first volume percent of fibers is greater than the second volume percent of fibers, and
the front end is configured to be coupled to a header, and
at least a portion of the unitary body has a transparency of greater than 0%.

* * * * *